July 1, 1930.  W. H. DUGGAN  1,769,179
CONTAINER AND HANDLE MEANS
Filed Aug. 22, 1927  2 Sheets-Sheet 1
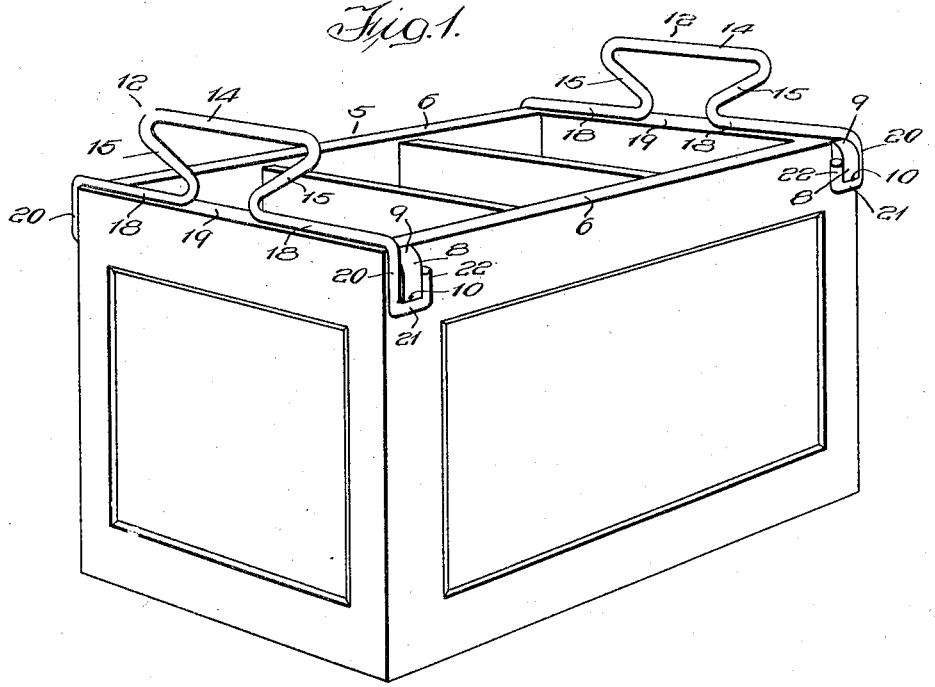
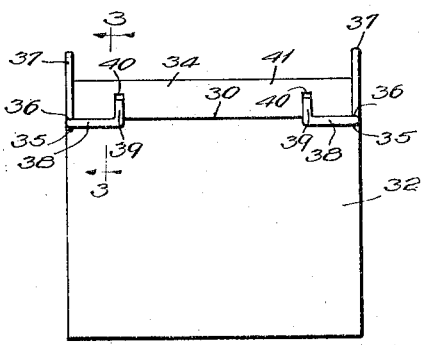
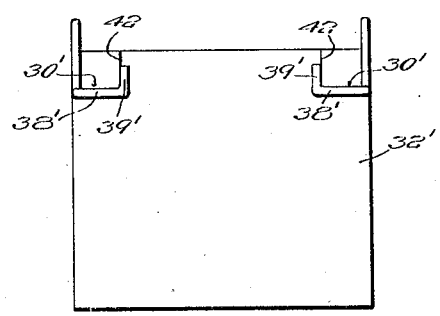
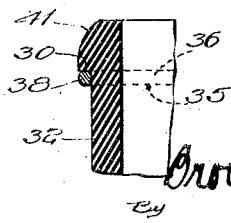
Witness:
William P. Kilroy
Inventor:
William H. Duggan
Brown, Boettcher & Dieser
By Att'ys July 1, 1930. W. H. DUGGAN 1,769,179
CONTAINER AND HANDLE MEANS
Filed Aug. 22, 1927   2 Sheets-Sheet 2
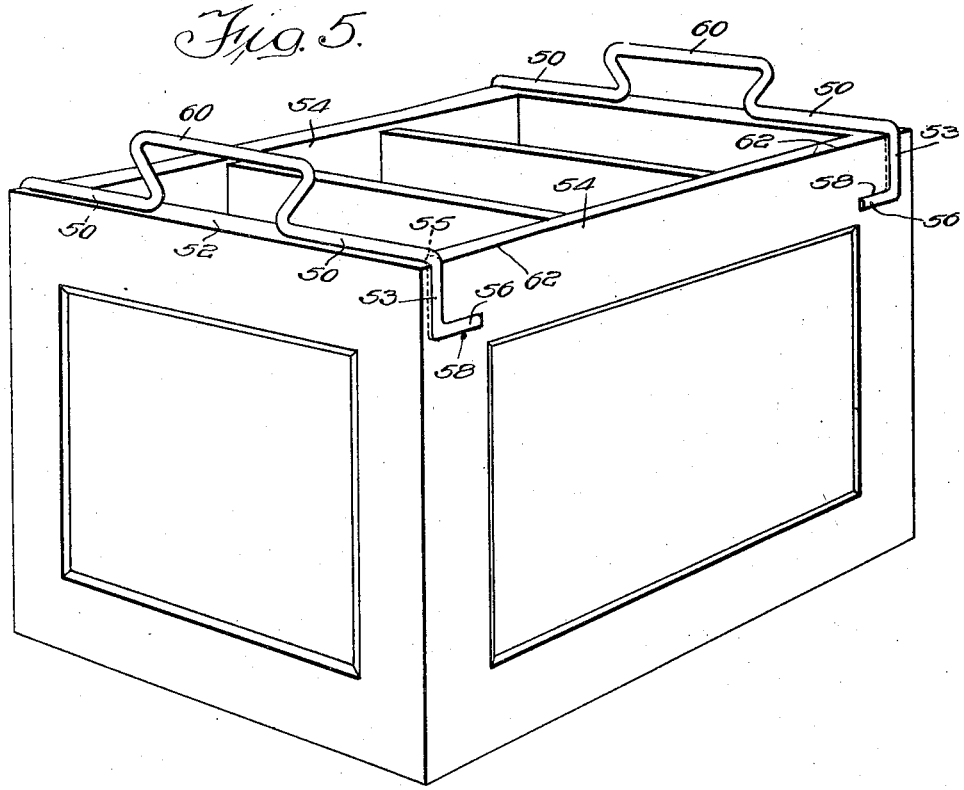
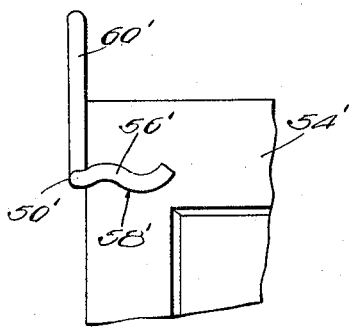
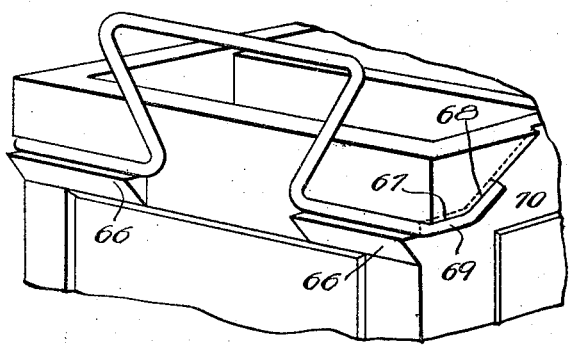
Witness:
William G. Kilroy
Inventor.
William H Duggan
Brown, Boettcher & Dienner
By Attys Patented July 1, 1930

1,769,179

UNITED STATES PATENT OFFICE

WILLIAM H. DUGGAN, OF CHICAGO, ILLINOIS, ASSIGNOR, BY MESNE ASSIGNMENTS, OF FOUR-TENTHS TO BENJAMIN CLARKE, ONE-TENTH TO C. W. CLARKE, AND ONE-TENTH TO FRANK M. CLARKE, ALL OF CHICAGO, ILLINOIS

CONTAINER AND HANDLE MEANS

Application filed August 22, 1927. Serial No. 214,557.

This invention relates to container and handle means for storage batteries and the like, and its object is the provision of a generally improved and simplified container and handle means that may be economically produced and a container and handle combination in which the handle may be readily applied.

The invention provides a separate handle structure having the required strength and adapted to be used not only for lifting the container, but for holding the container in place.

The invention also provides for holding the handle against accidental contact with any of the conductors of the battery and a metallic handle that may be readily and cheaply applied and which is securely attached and held in place with relation to the container.

The invention is illustrated in the accompanying drawings, in which

Fig. 1 is a perspective view of a container and handle means embodying the present invention;

Fig. 2 is a side elevational view of another embodiment of the invention;

Fig. 3 is a fragmentary vertical detail section taken on the line 3—3 of Fig. 2;

Fig. 4 is a view similar to Fig. 2 of another embodiment of the invention;

Fig. 5 is a perspective view of a further embodiment of the invention;

Fig. 6 is a fragmentary perspective view of a further embodiment of the invention; and Fig. 7 is a fragmentary side elevational view of another embodiment.

Referring to the embodiment of Fig. 1, the container is designated generally at 5. Where the container is used for storage batteries, it may be of hard rubber, composition, or other suitable material. The particular material of the container may be varied widely within the scope of the present invention. The outer surfaces of the sides 6 of the container 5 are provided with integral projections 8, one adjacent the top of each end of each side wall 6. The upper edges of the projections 8 are preferably rounded or tapered at 9 to facilitate springing the handle retention means thereover. The under surfaces of the projections 8 are disposed substantially normal to the sides of the container and provide downwardly facing shoulders for engaging the handle retention means and preventing upward movement of the handle means with respect to the container when the handles are applied in operative position upon the container. The downwardly facing shoulders provided by the projections 8 are designated at 10.

The handle means comprises a pair of separate handles 12, each of which is formed of spring metal or other suitable resilient material, and which may be in the form of rods of circular cross section, as shown, or otherwise as desired.

Each handle 12 is provided between its ends with an upwardly directed handle loop or offset bight 14 which serves the dual function of providing conveniently accessible handles and freeing the opposite ends of the handles for spreading into place upon the container. The side portions 15 of the bights 14 are preferably spread upwardly or of generally dovetail formation, as shown, so that the handles will be tensioned and the opposite ends contracted upon the sides of the container by any downward force or stress on the bights as well as by any upward force or stress thereon. The possibility of loosening of the handles by a downward pull on the bights 14 as by the engagement of suitable hold-down means therewith is thereby avoided.

The connecting portions 18 of the handles extend along the top or upper edges of the end walls 19 and the opposite ends are turned or extend downwardly at 20 and are hooked horizontally at 21 beneath the downwardly facing shoulders 10 of the projections 8 and up vertically at 22 into cooperation with the opposite sides of the projections 8. The hooked ends of the handles constitute the retention or attachment means, the portions 20 and 22 by their cooperation with the opposite sides of the projections 8 locking the handle in an upright position and against accidental displacement into contact with any of the conducting parts of the battery. The horizontal portions 20 engage beneath the shoulders 10 and the projections, therefore, carry the load of the container when it is lifted by means of the handle loops.

When the handle is applied, the portions 18 engage or cooperate with the upper edges of the end walls 19, which limit downward displacement of the handle, and where hold-downs are engaged with the bights 14 for holding the container down through the handle means, the cooperation of the handle portions 18 with the top of the container is adapted for sustaining the hold-down stresses.

In applying the handles the hooked ends are spread over the upwardly inclined surfaces 9 of the projections 8 and forced down to engage the portions 18 with the top of the container and snap the hooked ends around the projections 8, as shown.

It will be noted that the hold-down surfaces along the top edge are above the surfaces at the under sides of the projections 8 and that the entire handle is within the planes of the ends of the container.

As already pointed out, the handle is formed of resilient material and the handle loop forms a spring portion which permits the hooked ends to be spread over the projections 8, the yielding of the loop permitting the spreading of the ends over the container.

In the embodiment of Fig. 2 the downwardly facing shoulders 30 on the side walls 32 are formed by ribs 34 which extend from end to end along the upper margins of the side walls 32 of the container. In this case the end walls of the container are provided with upwardly facing shoulders or abutments 35 which may extend horizontally across the end walls from side to side and are spaced from the top of the container a distance sufficiently greater than the distance between the shoulders 30 and the top of the container so that the connecting portions 36 between the handle loops 37 and the hooked ends 38 may engage or cooperate with the upwardly facing end shoulders 35 with the hooked ends 38 turned in along the side walls of the container and underlying the shoulders 30. The ends 39 of the hooked portions 38 are turned up and engage, when the handle is in operative position upon the container, in vertical notches 40 in the ribs 34 and opening upwardly from the shoulders 30.

In this case the upper portions of the ribs 34 may be tapered at 41 similar to the tapering of the upper ends of the projections 8 of the previous embodiment to permit springing or spreading the hooked ends down over the ribs 34 to underlie the shoulders 30 and engage in the notches 40 with the connecting portions 36 cooperating with the upwardly facing shoulders 35. The formation of the loop or bight 37 may be similar to the formation of the loop or bight in the previous embodiment.

The embodiment shown in Fig. 4 is similar to the embodiment of Figs. 2 and 3, except that the shoulders 30', instead of extending along the side walls from end to end, terminate at 42 and the upturned ends 39' of the hooked ends 38' are turned up into cooperation with the vertical shoulders 42 which, as in the case of the engagement in the notches 40 of the previous embodiment, holds the handle in proper vertical position and against accidental displacement into engagement with the conducting portions of the battery.

In the embodiment of Fig. 5 the connecting portions 50 again lie upon the upper edges of the end walls 52. The ends are turned down at 53 upon the sides 54 of the container which may be grooved at 55 to receive the turned down vertical portions 53, the lower ends of which terminate in horizontally extending ends 56 which engage in horizontal sockets or grooves 58 in the side walls 54. The handle has a loop 60, as before, and is formed of resilient material, which, with the loop, afford sufficient springiness to permit spreading of the engaging portions 56 into position to seat in the grooves or sockets 58. The sockets 58 which, in this case, terminate short of the ends of the container lock the handle to the container, both as to lifting stresses and as to any downward stresses when the handle is used as a hold-down, and they also maintain the handle in an upright position. The termination of the grooves 58 short of the ends of the container prevents accidental endwise displacement of the handles.

The end portions of the side walls 54 of the container may be tapered at 62 to thicken the same so that there will be sufficient material for the grooves 58, and these thickened end portions may be tapered or inclined upwardly as at 9 in Fig. 1 to facilitate spreading of the socket engaging portions 56 into place.

In the embodiment of Fig. 7, the grooves 58' open at 65 from the end of the container and, in order to prevent accidental endwise displacement of the handle 54' the grooves 58' are given an undulating form and the groove engaging portions 56' are correspondingly crimped or waved, as shown. In this case the handle loop or bight 60' and connecting portions 50' are disposed beyond or along the vertical surface of the end wall instead of upon the top of the same, as before.

The embodiment of Fig. 6 is along the line of the embodiment of Fig. 7 with the exception that the end walls are provided with upwardly facing shoulders 66, and instead of grooves in the side walls, these walls are provided with downwardly facing shoulders 67 turned up at 68 with the inturned ends 69 of the handle turned up at 70 into cooperation therewith and the upwardly facing shoulders or bottom portions of the grooves omitted and replaced by the end shoulders 66. In this form the handles are sprung into place upon the container as in the other forms.

I claim:—

1. In combination, a battery container having end and opposite side walls, a pair of shoulders one on each said side walls adjacent the upper margins thereof and in substantial alignment with the opposite ends of an end wall of the container, a spring handle extending completely across the width of the container and seated upon the upper edge of the end wall of the container and turned down from the top of the container and upon the opposite side walls of the container at its opposite ends, and hooked to interlock with said side wall shoulders, said shoulders having sides sloping upwardly toward the top of the container for receiving said hooked ends directly from the top of the container and spreading said hooked ends over said shoulders and into interlocking engagement therewith from the top of the container, and an upwardly spread bight forming a handle loop between said connecting portions and contracting the hooked ends upon the sides of the container with a downward force on said bight.

2. In combination, a battery container having side and end walls with shoulder means on the side walls, a handle having hooked ends interlocking with said side wall shoulders, said handle having an intermediate spring section permitting the spreading of the hooked ends over the side wall shoulders, and said handle having connection portions between said hooked ends and said intermediate spring portion, said handle extending completely across the top of the container with said connecting portions seated directly upon the upper edge wall of the container.

3. In combination, a battery container having side and end walls with projections on its side walls, the tops of the projections being tapered and a handle having hooked ends interlocking with said projections, said handle having an intermediate spring section permitting the spreading of the hooked ends over the projections, the tapered tops of the projections diminishing the spread across said projections upwardly and acting to spread the hooked ends of the handle as the handle is crowded downwardly upon said tapered projections, and said handle having connecting portions between said hooked ends and said intermediate spring portion, said handle extending completely across the top of the container with said connecting portions seated directly upon the upper edge of the end wall of the container.

In witness whereof, I hereunto subscribe my name this 17th day of August, 1927.

WILLIAM H. DUGGAN.